United States Patent [19]

Yasunaga

[11] 4,152,587
[45] May 1, 1979

[54] READER FOR GRAPH CURVE LINES AND LIKE

[76] Inventor: Soichiro Yasunaga, 2-28, Denenchofu, Onta-ku, Tokyo, Japan

[21] Appl. No.: 850,362

[22] Filed: Nov. 10, 1977

Related U.S. Application Data

[63] Continuation of Ser. No. 651,430, Jan. 22, 1976, abandoned.

[30] Foreign Application Priority Data

Sep. 29, 1975 [JP] Japan .................. 50-116426

[51] Int. Cl.² .................................. G05B 1/00
[52] U.S. Cl. ........................... 250/202; 250/571
[58] Field of Search .................. 250/202, 559, 571; 356/199, 200

[56] References Cited

U.S. PATENT DOCUMENTS

| | | | |
|---|---|---|---|
| 2,961,547 | 11/1960 | Snavely | 250/202 |
| 3,529,084 | 9/1970 | Rich | 250/202 |

Primary Examiner—Alfred E. Smith
Assistant Examiner—David K. Moore
Attorney, Agent, or Firm—William J. Daniel

[57] ABSTRACT

A curve line reader of the type wherein a recording medium carrying an optically visible curve line is caused to move relatively to an electronic camera tube which electronically scans an optical image of the medium along a locus extending transversely of the recording direction to generate a video output signal containing pulses produced by the impingement of the tube scanning beam upon the curve line image is modified by the addition of a semicylindrical optical lens having a length at least equal to the transverse dimension of the recording material and arranged with its longitudinal axis lying in the plane of the scanning locus of the camera tube whereby the optical image received by the camera tube is selectively magnified in a direction parallel to the recording direction to sharpen the video output pulses generated by the curve line segments having a large directional component parallel to the scanning locus of the camera tube.

2 Claims, 4 Drawing Figures

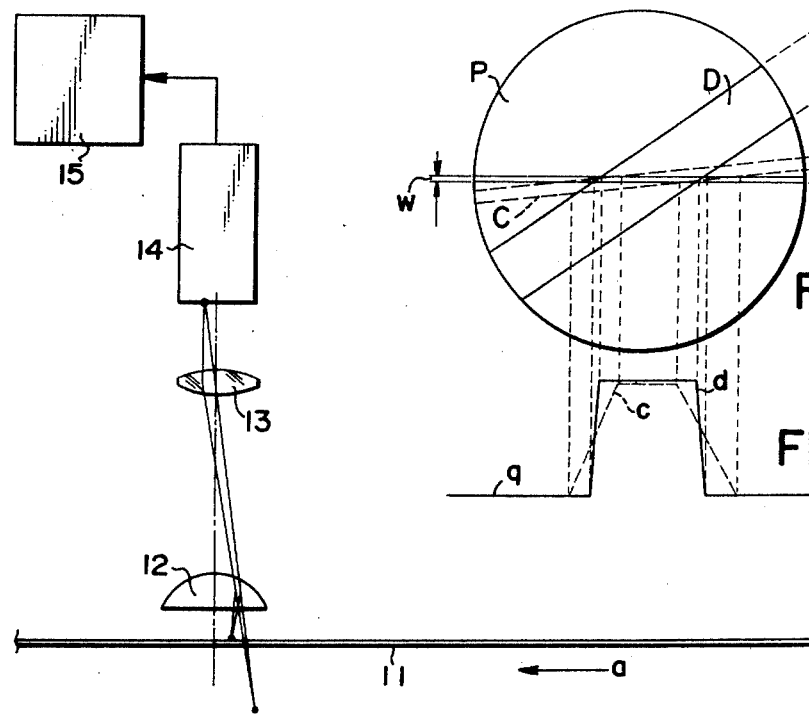
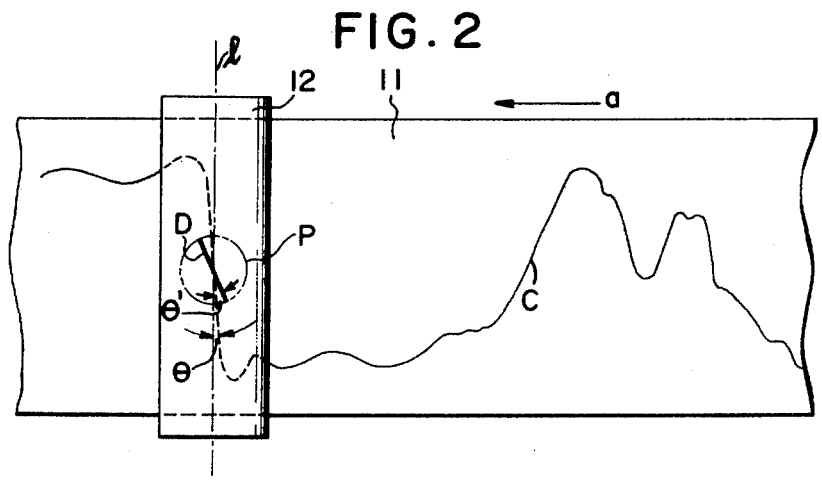

READER FOR GRAPH CURVE LINES AND LIKE

This is a continuation, of Ser. No. 651,430, filed Jan. 22, 1976 and now abandoned.

This invention relates to an improved reader for curve lines plotted or inscribed on graphs, charts and the like and is concerned more particularly with an improved optical system for a curve line reader.

BACKGROUND OF THE INVENTION

In modern technology, it is frequently necessary or desirable to monitor various operating conditions for industrial processes and to retain a record of this information which can be analyzed or compared if the need should arise. For this purpose, various recording devices adapted to inscribe a visible curve on a record medium, such as an elongated strip chart, a circular chart or the like, driven at a given rate of speed so that variations in the monitored condition as a function of time are recorded in visible form have been developed.

With increasing emphasis being placed on the operation of industrial processes by remote control with a maximum of automation, it has become necessary to transmit the operating parameters for the given processes to remote locations, and curve scanning and transmitting systems, which will be referred to here as a "curve line reader," have been developed for this purpose. Such a system typically utilizes a television camera tube on the face of which is projected an optical image of a given portion of the recording medium to be read, and this optical image is repeatedly scanned by the electron beam of the camera tube at the usual high scanning rate along a substantially linear locus, extending at right angles to the length of the medium to be scanned. Since the optical density of the visible curve line differs from the background density of the medium, a pulse will be created in the video signal each time the beam crosses the curve line. Thus, the video signal gives an electronic representation of the location of each precise segment of the curve scanned by the electronic beam and from these signals, the original curve can be recreated at a remote point or fed either as analong or digital values to an electronic computer serving to process the data as may be desired.

In has been found that curve line readers of this type provide a satisfactory indication of the curvature of the curve line being scanned so long as the direction of the curve line generally follows the direction of the relative movement between the recording medium and the camera tube, i.e. where all of the segments of the curve line extend at a significant angle relative to the scanning locus of the video tube. However, where the curve includes segments of a direction substantially parallel to the video scanning direction of the electron beam, as would occur when a sharp or instantaneous variation of significant magnitude in the process variable has been recorded, the representation of the position of such curve segments becomes inaccurate. In this case, the "apparent width" of the curve line being transmitted becomes greatly extended or expanded although the actual width of the line inscribed by the recorder does not in fact change, due to the coincidence between the directions of the electron scanning beam and the curve line segment being scanned. Since the diameter of the scanning electron beam has a certain finite magnitude and the leading and trailing edges of an almost parallel line segment being scanned only gradually intrude into and out of the path of the scanning beam under such circumstances, the rise and fall of the video signal pulse created at the crossing of the line becomes increasingly gradual or "dull," making identification of the precise geometrical position of the curve from the video signals difficult.

SUMMARY OF THE INVENTION

According to the present invention, this problem is reduced by interposing a semicylindrical optical lens extending the full transverse dimension of the recording medium with its longitudinal axis lying in the plane of the transverse scanning locus of the camera tube between the video camera tube and the curve-bearing recording medium. Such a lens projects an image of the recording medium magnified selectively in the direction corresponding to the direction of the recording medium length onto the face of the camera tube. Therefore, the camera tube receives an "apparent" optical image in which small deviations in the surve line direction from the scanning direction are magnified, thus making more precise detection of the beginning and end of the curve line by the scanning beam possible.

BRIEF DESCRIPTION OF THE DRAWINGS

The details of one operating embodiment of a curve reading system according to the invention will be more fully understood from the accompanying complete description when read in conjunction with the accompanying drawings in which:

FIG. 1 is a schematic side elevation of a reader according to the invention taken generally at right angles to the direction of relative movement or length of the recording medium;

FIG. 2 is a top plan view looking down on the arrangement shown in FIG. 1; and

FIG. 3a is a detail view of the optical field of the television camera for a curve line segment extending almost parallel to the camera scanning direction, the direction of the recorded curve line segment itself being indicated in dash lines with the direction of the "apparent curve segment," as provided according to the invention being shown in solid lines; while FIG. 3b is a detail view of the corresponding waveforms of the video signals for the respective images of FIG. 3a.

As shown in the diagram of a representative embodiment of the invention depicted in FIGS. 1 and 2, a recording medium in the form of an elongated strip chart 10 bearing a linear curve C inscribed thereon in some visible form is advanced in the direction of its length indicated by the arrow a at a constant predetermined speed by means not shown. At a fixed location along the path of the recording paper R is a television camera or video tube 14 which is preferably a vidicon type tube. As is known, and hence not shown in the drawings, a vidicon tube includes a photoelectric signal plate which receives an optically projected image of a certain area of the recording medium via a conventional arrangement of optical lens represented at 13. The field of vision of the camera tube and lens should cover the entire transverse dimension of the recording medium, or at least that portion occupied by the curve line, to ensure coverage of the entire range of variation of the curve line. Within the camera tube 14, a narrow electronic beam is moved in a transverse direction by means of the horizontal deflection coil of the tube. Where relative movement between the recording medium and tube is achieved by advancing the medium itself, as is preferred, the movement of the scanning beam is along a fixed transverse locus indicated by the chain line seen in FIG. 2.

In accordance with the invention, a semicylindrical optical lens of the converging type 12 is interposed between the recording medium and the standard projection lens 13 so as to transmit to the latter lens an optical image which is substantially magnified selectively in the direction parallel to the direction of movement a of the recording medium. Such a lens is in the form of a semicylindrical element extending transversely substantially the entire transverse dimension of the recording material with its longitudinal axis lying in the plane of the scanning locus l of the camera tube 14. The curved side of magnifying lens 12 faces the camera tube while its flat side faces the recording material, and thus the magnification effect of lens 12 occurs only in the direction parallel to the arrow a and does not occur in the transverse direction. Consequently, the optical image of curve line C projected by magnifying lens 12 is enlarged or exaggerated selectively in the direction of movement of the recording medium 10 so that the lengthwise directional component of the curve is exaggerated or enlarged in the "apparent image" transmitted by lens 12.

For purposes of illustrating the operation of this invention, the curve line C is shown in FIG. 2 to include a portion, located coincident with the scanning location, where the curve line changes almost instantaneously between widely separated values. The general direction of the curve line segment in this region is therefore nearly parallel to the scanning locus l, diverging therefrom only by a small angle represented by the symbol $\theta$. An arbitrary portion, within the dotted line circle p, of the "apparent image" projected by lens 12 is shown as a heavy solid line D in FIG. 2, and it will be seen that the small actual angle $\theta$ is expanded to a considerably larger "apparent angle" $\theta'$.

The video output signal from the television tube 14 is delivered to a processing circuit represented at 15 which can be at the remote location where the operating information is to be utilized. The video output signal for each of the scanning cycles of the electron beam of the camera tube will include an output pulse which is generated by the change in the electrical output of the video tube when the scanning beam moves from the optically less dense background coloration of the recording material to the optically more dense line of the recorded curve. This change in output will exceed possible normal variations in the coloration of the recording material or possible discolorations in that material due to accidental spotting, smudging and the like, and the processing circuit can be controlled to respond only to signal changes of a magnitude which exceeds such natural "noise" in the system. By measuring the time interval from the initiation of each scanning cycle to the pulse generated from the curve, a representation is obrained of the finite distance of the curve from the edge of the recording material where the scanning beam starts. This representation can be used to recreate the curve line in a visual mode, using a cathode-ray tube of a conventional television receiving tube, or it can be converted to a digital value for processing by an electronic computer for a variety of different purposes.

The rationale of the present improvement is most readily perceived by a comparison of a segment of the curve line in its actual form, as scanned in conventional curve readers, versus its "apparent form," as scanned in the improved system of the invention. Referring for this purpose to FIG. 3a, there is shown here in enlarged form a circular area p which is arbitrarily selected to correspond with the similarly designated area shown in dotted lines in FIG. 2. In FIG. 3a the alphabetical symbol l again represents the transverse scanning locus of the electron beam having a finite width represented by the symbol w. The actual curve line C is shown in dashed lines with a finite thickness x, the deviation between curve line C and locus l being shown by the angle $\theta'$. The "apparent" curve line image, as transmitted by the selective magnifying lens 12, is illustrated by solid lines at D, and the thickness of the apparent curve line D has been substantially magnified as indicated at x', while the apparent deviation angle has likewise been magnified as indicated at $\theta'$.

Waveforms of the pulses in the video output signal generated for the actual and "apparent" curve segments C and D, respectively, are illustrated in FIG. 3b. Considering first the actual curve line segment C, as the electron beam of the thickness w gradually impinges upon curve line C within its path, the waveform rises from its background level q at a gradual rate, the slope of which is a function of the magnitude of the angle $\theta$. That is, as the angle $\theta$ approaches zero (or parallel with the scanning locus l of the electron beam) the slope of the signal in the video output becomes less or flatter. Once the full width of the electron beam falls within the thickness x of curve line C, the video output reaches its peak and remains constant until one edge of the electron beam moves outside the curve line. Then the video signal begins to decrease at a rate which is again dependent upon the magnitude of the angle $\theta$. The resultant waveform pulse has the shape of a regular trapezoid, as seen in dashed lines at c in FIG. 3b. Obviously, the processing circuit 15 receiving a waveform pulse such as c will have difficulty in providing a sharp indication of the location of the curve line segment C because the location of the curve can be perceived by the circuit as falling at any point within the sloping leading side of the waveform dependent upon the magnitude of the signal above background noise to which the processing circuit is set to respond.

This problem is substantially reduced by the improvement according to the invention since the "apparent" direction of the curve line segment has been substantially increased as at D and, therefore, the slope of the sides of the waveform are correspondingly increased. Where the magnification factor of the semicylindrical lens 2 is appropriately selected, the waveform of the "apparent image" D has a virtual square wave configuration, represented by the solid line d, which approximates the slope of pulses produced for the curve line under normal circumstances.

Since the optical density of the background region of the recording surface as well as of the curve line itself are not affected by the selective magnifying lens 12 of the invention, the addition of that lens by this invention does not alter the amplitude of the video output signals of the camera tube. Similarly, directional changes of the curve line parallel to the recording medium are not affected by the magnifying lens.

Normally, the recording medium carrying the curve is advanced at a constant rate past the fixed position of the video tube so that the scanning beam of the tube moves perpendicularly to such direction of movement along a fixed locus traversing the recording medium from one side to the other. Alternatively, it is also possible to drive the scanning beam in a vertical direction in the conventional way by means of the vertical deflection coil normally provided in the tube. Thus, where the recording material is of short length within the vertical scanning capacity of the tube, and the magnifying lens 12 can be positioned to handle that length of material, the medium could be left stationary and scanning achieved electronically. In most instances, however, recording charts are of considerable length and mechanical advance of the medium past a fixed scanning locus is the preferred mode of operation.

Some modifications in the improved system of the invention have been mentioned above, and others will occur to those skilled in the art and are to be construed as within the scope of the invention as defined by the appended claims.

What is claimed is:

1. In a curve line reader in which a recording medium carrying an optically visible curve line is caused to move relatively to an electronic camera tube which electronically scans an optical image of the medium projected upon it along a locus extending transversely across the direction of relative movement to generate a video output signal including pulses created by the repeated impingement of the tube scanning beam upon the curve line image, the improvement comprising optical magnifying means including a converging lens elongated along a lengthwise axis disposed on the same side of said recording medium as said camera tube, said lens having on the side facing said camera tube a convex face of generally uniform arcuate extent throughout its length and generally uniform curvature with respect to an axis extending longitudinally parallel to said lengthwise axis of said lens and an opposite face intersecting said convex face along two generally uniformly spaced apart straight lines which extend transversely across said direction of relative movement parallel to the scanning locus of said camera tube, the length of said elongated lens being at least equal to the effective transverse dimension of the recording material, said lens being arranged with its longitudinal axis extending parallel to said transverse scanning locus and lying generally within the plane of the scanning locus of the camera tube, whereby the elongated lens creates an image of the portion of the recording medium within its field which is substantially magnified selectively in a direction parallel to the relative movement direction; and a focusing lens interposed between said elongated lens and said camera tube and cooperating therewith to transmit said selectively magnified image to said camera tube to sharpen the video output signals corresponding to curve line segments which have a large directional component parallel to the scanning locus of the camera tube.

2. The curve line reader of claim 1 wherein said recording medium is in the form of an elongated strip and said strip is advanced at a substantially constant rate past a fixed scanning locus for said camera tube.

* * * * *